US011495100B1

(12) United States Patent
Cooney

(10) Patent No.: US 11,495,100 B1
(45) Date of Patent: Nov. 8, 2022

(54) VERSATILE VIDEO SURVEILLANCE AND ALARM SIGNALING ASSEMBLY

(71) Applicant: Dwayne K. Cooney, Fenton, MO (US)

(72) Inventor: Dwayne K. Cooney, Fenton, MO (US)

( * ) Notice: Subject to any disclaimer, the term of this patent is extended or adjusted under 35 U.S.C. 154(b) by 0 days.

(21) Appl. No.: 17/676,608

(22) Filed: Feb. 21, 2022

Related U.S. Application Data

(60) Provisional application No. 63/182,873, filed on May 1, 2021.

(51) Int. Cl.
| G03B 17/08 | (2021.01) |
| G03B 17/56 | (2021.01) |
| G08B 13/196 | (2006.01) |
| H04N 5/225 | (2006.01) |
| G08B 5/36 | (2006.01) |

(52) U.S. Cl.
CPC ......... *G08B 13/19632* (2013.01); *G08B 5/36* (2013.01); *H04N 5/2252* (2013.01); *H04N 5/2254* (2013.01)

(58) Field of Classification Search
USPC .................. 396/427; 348/143, 159
See application file for complete search history.

(56) References Cited

U.S. PATENT DOCUMENTS

| 7,298,969 | B2* | 11/2007 | Elberbaum | G03B 37/04 |
| | | | | 396/428 |
| 7,382,252 | B2* | 6/2008 | Brannon | G08B 7/064 |
| | | | | 40/566 |
| 10,706,696 | B1* | 7/2020 | Pachikov | B64C 39/024 |
| 10,928,712 | B1* | 2/2021 | Bohning | G03B 17/561 |
| 11,347,138 | B1* | 5/2022 | Bohning | G03B 17/561 |
| 2003/0142853 | A1* | 7/2003 | Waehner | G07C 9/37 |
| | | | | 382/118 |

* cited by examiner

*Primary Examiner* — Clayton E. La Balle
*Assistant Examiner* — Warren K Fenwick
(74) *Attorney, Agent, or Firm* — Patentfile, LLC; Bradley C. Fach; Steven R. Kick

(57) ABSTRACT

A versatile video surveillance and alarm signaling assembly may include a vertical post, and a first surveillance camera may be coupled to the vertical post, the first surveillance camera having a first camera lens. A second surveillance camera may also be coupled to the vertical post, the second surveillance camera having a second camera lens, in which the first camera lens and second camera lens may be angled between 75 and 200 degrees relative to each other. Preferably, the assembly may include one or more of a mailbox, postal address number, and/or a signage that may be coupled directly or indirectly to the vertical post.

20 Claims, 17 Drawing Sheets

VERSATILE VIDEO SURVEILLANCE AND ALARM SIGNALING ASSEMBLY

CROSS REFERENCE TO RELATED APPLICATIONS

This application claims priority to and the benefit of the filing date of U.S. Provisional Application No. 63/182,873, filed on May 1, 2021, entitled "Versatile Video Surveillance and Alarm Signaling Assembly", which is hereby incorporated by reference in its entirety.

FIELD OF THE INVENTION

The present invention relates to a novel Versatile Video Surveillance and Alarm Signaling Assembly in various embodiments of a mailbox post, address display post, sign post, or other types of posts, that also captures images of vehicle details, license plates, number plates, vehicle occupants, pedestrians, alphanumeric codes or visual codes, as well as optionally alert first responders of alarm events through visual signaling. More particularly, the present invention relates to an inconspicuous, decorative and versatile street-side video surveillance and alarm signaling assembly with surveillance cameras, auxiliary illuminators and optional alarm signaling lights, enabling an inconspicuous, decorative, and versatile street-side video surveillance and alarm signaling assembly that also serves as a mailbox post, address display post, sign post, or other post variations.

BACKGROUND

Accurate image capture of vehicle details, license plates, number plates, vehicle occupants, pedestrians, alphanumeric codes or visual codes with surveillance camera systems require specific camera positioning and angles to ensure clear, legible and identifiable images. Consumer grade electronics such as video doorbells, video flood lights, and other consumer grade video surveillance devices often have limited mounting locations, mounting methods, positioning, angles, lighting and video resolution required to capture identifiable and actionable images of vehicle details, license plates, number plates, vehicle occupants, pedestrians, alphanumeric codes or visual codes in daylight, challenging lighting conditions, or total darkness. This has become more apparent with the popularity of consumer grade video security devices and the subsequent increase in recordings of package theft, vehicle larceny, car theft, vandalism and other crimes.

While video surveillance cameras, auxiliary infrared (IR) illuminators and alarm signaling lights exist, no prior art enables an inconspicuous video surveillance assembly to capture street-side images of vehicle details, license plates, number plates, vehicle occupants, pedestrians, alphanumeric codes or visual codes in daylight, challenging lighting conditions or total darkness, that optionally provides a street-side alarm signaling light notification, activated by the signaling outputs of burglar alarm, panic alarm, fire alarm, medical alert, or any other electronic notification system, to alert first responders to the exact postal address of an alarm, that also serves as decorative mailbox posts, address display posts, sign posts, and other variations of posts.

Also, while decorative mailbox posts, address display posts, sign posts, and other variations of posts exist, no prior art enables an inconspicuous video surveillance assembly to capture images of vehicle details, license plates, number plates, vehicle occupants, pedestrians, alphanumeric codes or visual codes in daylight, challenging lighting conditions or total darkness while also providing a street-side alarm signaling light notification assembly, activated by signaling outputs of burglar alarm, panic alarm, fire alarm, medical alert, or any other electronic notification system, to alert first responders to the exact postal address of an alarm.

Current camera mounting and positioning methods also lack an inconspicuous, decorative and versatile street-side assembly for use in applications where aesthetics are important to property owners or when property owners are limited or regulated by homeowners associations, local government guidelines, covenants, conditions, codes and restrictions. Often times, video surveillance camera assemblies designed to capture vehicles and/or license plate characters are large, very conspicuous, intended for commercial or industrial environments and are unsightly in residential applications.

Furthermore, alarm system users often utilize alarm signaling lights activated by the signaling output of burglar alarm, panic alarm, fire alarm, medical alert and other electronic alarm systems to alert first responders such as police, fire, or medical personnel to homes or buildings where an alarm was activated. Mounting methods for these alarm signaling lights often utilize mounting locations on a home or building, typically an exterior wall or soffit, which can be difficult for first responders to locate quickly when approaching the location of the alarm.

Therefore, a need exists in the field for a novel Versatile Video Surveillance and Alarm Signaling Assembly to enable an inconspicuous, decorative and versatile video surveillance assembly to capture street-side images of vehicle details, license plates, number plates, vehicle occupants, pedestrians, alphanumeric codes or visual codes during daylight conditions, in various embodiments of decorative mailbox posts, address display posts, sign posts, and other posts variations.

Additionally, a need exists in the field for a novel Versatile Video Surveillance and Alarm Signaling Assembly enabling an inconspicuous, decorative and versatile video surveillance assembly to capture street-side images of vehicle details, license plates, number plates, vehicle occupants, pedestrians, alphanumeric codes or visual codes, during challenging lighting conditions or total darkness, in various embodiments of a decorative mailbox posts, address display posts, sign posts, and other posts variations.

Finally, a need exists in the field for a novel Versatile Video Surveillance and Alarm Signaling Assembly enabling an inconspicuous, decorative and versatile street-side alarm signaling light notification that, when activated by signaling outputs of burglar alarm, panic alarm, fire alarm, medical alert, or any other electronic alarm system, may alert first responders such as police, fire, or medical personnel to the exact postal address of an alarm.

BRIEF SUMMARY OF THE INVENTION

A novel Versatile Video Surveillance and Alarm Signaling Assembly is provided which may include one or more surveillance camera assemblies, optionally with an infrared (IR) light emitting surface and optionally with 3-axis articulation, preferably at 45 degree angles, or any other angles, in relation to vehicular traffic, and optional infrared (IR) auxiliary illuminators mounted preferably at 45 degree angles, or any other angles, in relation to vehicular traffic, enabling an inconspicuous, decorative and versatile street-side video surveillance assembly for capturing images of vehicle details, license plates, number plates, vehicle occupants, pedestrians, alphanumeric codes or visual codes in daylight, challenging lighting conditions or total darkness, in various embodiments of a decorative mailbox posts, address display posts, sign posts, and other post variations.

In some embodiments, the assembly may include a vertical post, and a first surveillance camera may be coupled to the vertical post, the first surveillance camera having a first camera lens. A second surveillance camera may also be coupled to the vertical post, the second surveillance camera having a second camera lens, in which the first camera lens and second camera lens may be angled between 75 and 200 degrees relative to each other. Optionally, a first auxiliary illuminator may also be coupled to the vertical post, the first auxiliary illuminator having a first light emitting surface. Optionally, a second auxiliary illuminator may also be coupled to the vertical post, the second auxiliary illuminator having a second light emitting surface, in which the first light emitting surface and second light emitting surface may be angled between 75 and 200 degrees relative to each other. Optionally, the assembly may include one or more of a mailbox, postal address number, and/or a signage.

In further embodiments, the assembly may include a vertical post and a mailbox. A first surveillance camera may be coupled to the vertical post, the first surveillance camera having a first camera lens. A second surveillance camera may also be coupled to the vertical post, the second surveillance camera having a second camera lens, in which the first camera lens and second camera lens may be angled between 75 and 200 degrees relative to each other. A network interface may be in communication with the first and second surveillance cameras. Optionally, a first auxiliary illuminator may also be coupled to the vertical post, the first auxiliary illuminator having a first light emitting surface. Optionally, a second auxiliary illuminator may also be coupled to the vertical post, the second auxiliary illuminator having a second light emitting surface, in which the first light emitting surface and second light emitting surface may be angled between 75 and 200 degrees relative to each other.

In preferred embodiments, the present invention may optionally include a horizontal mailbox support arm that may be diagonally or perpendicularly intersected through apertures in a vertical post section to provide a means for supporting various styles of mailboxes. This assembly enables a method for mounting surveillance cameras and auxiliary illuminators, preferably at 45 degree angles, or any other angles, in relation to various vehicular traffic scenarios, therefore enabling an inconspicuous, decorative and versatile street-side video surveillance assembly to capture images of vehicle details, license plates, number plates, vehicle occupants, pedestrians, alphanumeric codes or visual codes in challenging lighting conditions or total darkness, in various embodiments of a decorative mailbox posts, address display posts, sign posts, or other post variations.

In preferred embodiments, the present invention may include alarm signaling lights that can be connected to and activated by signaling outputs of burglar alarm, panic alarm, fire alarm, medical alert, or any other electronic notification system, to alert first responders such as police, fire, or medical personnel to the exact address of an alarm.

It is an object of the present invention to provide a novel Versatile Video Surveillance and Alarm Signaling Assembly as the image capture device for, but not limited to, local, remote or hosted video surveillance software and/or systems that record, store and process images for general video surveillance, license plate capture (LPC) systems, or any other alphanumeric or visual code image capture.

Another object of the present invention is to provide a novel Versatile Video Surveillance and Alarm Signaling Assembly as the image capture device for local, remote or hosted video surveillance software and/or systems that record, store and process images for general video surveillance, License Plate Recognition (LPR), Automatic License Plate Recognition (ALPR), Automatic Number Plate Recognition (ANPR), optical character recognition (OCR), artificial intelligence (A.I.), video analytics, or visual code software and/or systems typically designed to identify, record, store and alert end users to vehicles, license plates, alphanumeric or visual codes, related to, but not limited to, vehicles or equipment of interest, BOLO's (Be on the Lookout), criminal investigations, orders of protection, missing persons, Amber Alerts, Silver Alerts, traffic studies, restricted vehicles, service vehicles, patrol vehicles, deliveries, employees, customers, VIP's, family, visitors, manufacturing processes or delivery processes.

Still another object of the present invention is to provide a novel Versatile Video Surveillance and Alarm Signaling Assembly as a capture device for access control systems or any other commercial or home automation systems designed to electronically open vehicle gates, traffic control arms, bollards and other physical security barriers as well as activate lighting, heating & cooling, and other smart home controls through identification and processing of approved license plates, number plates or any other alphanumeric or visual codes assigned to a person, vehicle or equipment.

These, together with other objects of the present invention, along with various features of novelty that characterize the present invention, are pointed out with particularity in the claims annexed to and forming a part of this disclosure.

It is therefore another object of the present invention to provide a novel Versatile Video Surveillance and Alarm Signaling Assembly that may be easily and efficiently manufactured and marketed to a consuming public.

For a better understanding of the present invention, its operating advantages and the specific objects attained by its uses, reference should be made to the accompanying drawings and descriptive matter in which there are illustrated preferred embodiments of the present invention.

BRIEF DESCRIPTION OF THE DRAWINGS

Preferred embodiments of the present invention are illustrated as an example and are not limited by the figures of the accompanying drawings, in which like references may indicate similar elements and in which.

DESCRIPTION OF THE REFERENCED NUMERALS

Figure 1A:
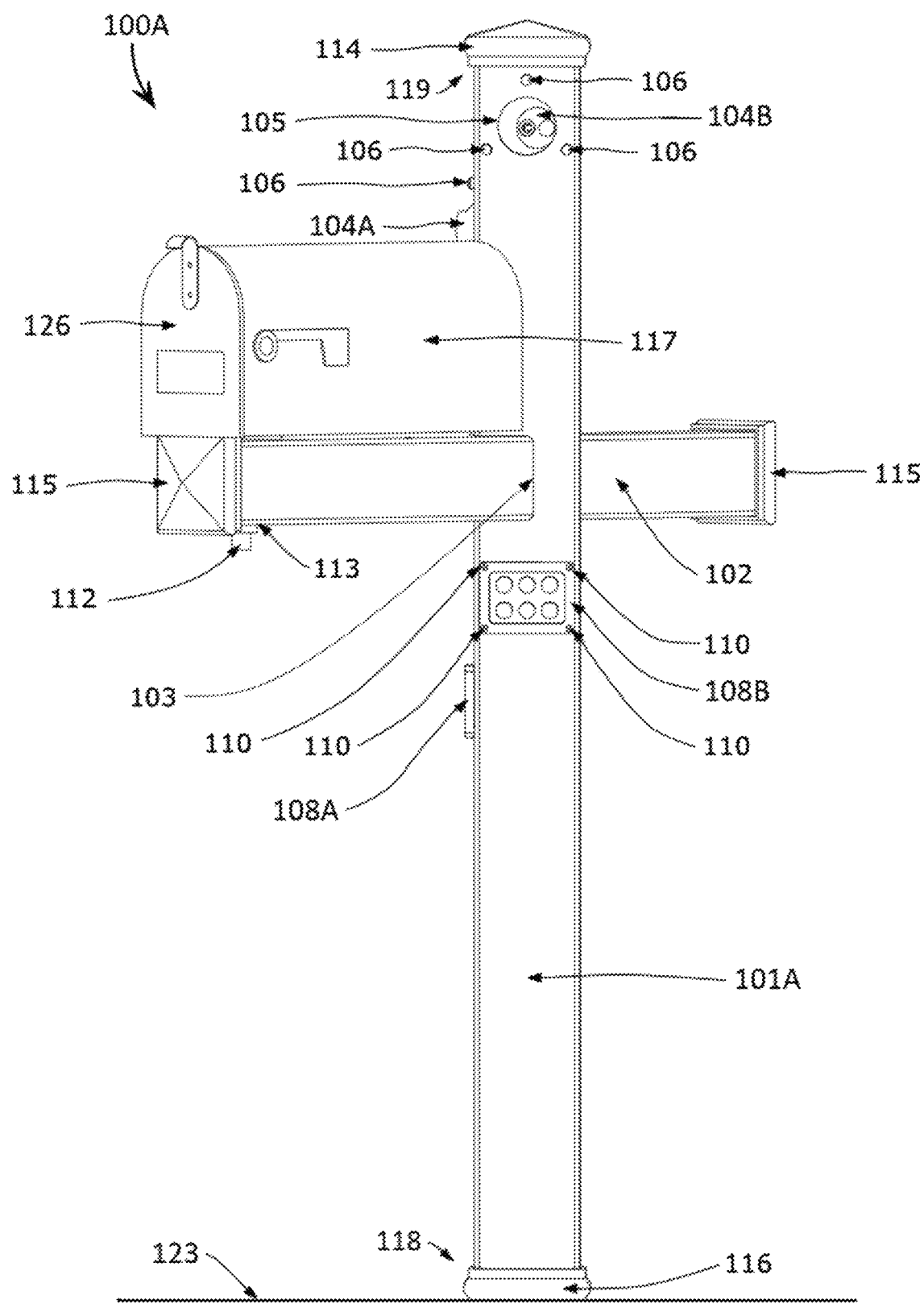
FIG. 1A is a perspective view illustration of an example of a novel Versatile Video Surveillance and Alarm Signaling Assembly, according to preferred embodiments of the present invention described herein.

100A—Mailbox Post Assembly
100B—Address Post Assembly
100C—Sign Post Assembly
101A—Mailbox Vertical Post
101B—Address Post Vertical Post
101C—Sign Post Vertical Post
102—Mailbox Support Arm
103—Support Arm Aperture
104A, 104B—Surveillance Cameras
105, 105A, 105B—Camera Apertures
106—Fastener Cap Assembly
107—Camera Fastener Aperture
108A, 108B—Auxiliary Illuminators
109A, 109B—Auxiliary Illuminator Apertures
110—Auxiliary Illuminator Fasteners
111—Auxiliary Illuminator Fastener Apertures
112—Alarm Signaling Light
113—Alarm Signaling Light Aperture
114—Decorative Vertical Post Cap
115—Mailbox Support Arm Decorative Caps
116—Decorative Base
117—Mailbox
118—Bottom End
119—Top End
120A, 120B—Camera Lenses
121A, 121B—Light Emitting Surfaces
122—Post Cavity
123—Ground Surface
124—Proximal End
125—Distal End
126—Door
127—Mail Axis
128—Traffic Direction
130—Camera Body
202—Postal Address Numbers
302—Signage
500—Camera Mount Assembly
501A, 501B—Mounting Plates
502—Mounting Plate Aperture
503—Threaded Aperture
504—Fastener
505—Mounting Plate Grommet
600—Full Size Vehicle Capture Image
601—Cropped License Plate Image
701—Category LAN Cable
702A—PoE (power-over-Ethernet) Switch Network Interface
702B—LAN Switch Network Interface
703—Internet Gateway
704—Internet Service Provider
705—Hosted Video Security and/or LPR Service
706—Local Video Security Server and/or LPR Server
707—Multi-Conductor Power Cable
708—Low-Voltage Power Supply
709—Multi-Conductor Power Cable
801—Multi-Conductor Alarm Cable
802—Multi-Conductor Alarm Cable
803—Multi-Conductor Alarm Cable
804—Intrusion Alarm Switch
805—Passive Infrared Motion Detector (PIR)
806—Panic Alarm Switch 900—Cellular Gateway
901—Wifi Antenna

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

As used herein, "horizontal and "vertical" refer to general orientations of respective post sections when they are assembled for use in various embodiments of the invention.

Novel Versatile Video Surveillance and Alarm Signaling Assemblies, devices, apparatuses and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1A-8 and 11 illustrate examples of a versatile video surveillance and alarm signaling assembly ("the assembly") 100A, 100B, 100C, according to various embodiments. It should be understood that the suffixes of "A", "B", "C", "D", etc., designate different embodiments of the assembly 100A, 100B, 100C, 100D, and that likewise, the suffixes of "A", "B", "C", "D", etc., designate different embodiments of elements described herein. In some embodiments, the assembly 100A, 100B, 100C, may comprise a vertical post 101A, 101B, 101C, which may extend away from a ground surface 123. A first surveillance camera 104A, having a first camera lens 120A, may be coupled to the vertical post 101A, 101B, 101C, and a second camera 104B, having a second camera lens 120B, may be coupled to the vertical post 101A, 101B, 101C. The first camera lens 120A may be angled between 75 and 200 degrees, and more preferably approximately 90 degrees relative to the second camera lens 120B. Optionally, the assembly 100A, 100B, 100C, may include a first auxiliary illuminator 108A, having a first light emitting surface 121A, that may be coupled to the vertical post 101A, 101B, 101C. Optionally, the assembly 100A, 100B, 100C, may include a second auxiliary illuminator 108B, having a second light emitting surface 121B, that may be coupled to the vertical post 101A, 101B, 101C, and the first light emitting surface 121A may be angled between 75 and 200 degrees, and more preferably approximately 90 degrees relative to the second light emitting surface 121B.

The assembly 100A, 100B, 100C, may comprise a vertical post 101A, 101B, 101C, which may extend away from a ground surface 123 by having a bottom end 118 that may be coupled to or proximate to the ground surface 123 and a top end 119 that may be distal to the ground surface 123. Preferably, the top end 119 may extend away from a ground surface 123 in a direction that is substantially perpendicular to the ground surface 123. In preferred embodiments, a vertical post 101A, 101B, 101C, may comprise a linear shape so that portions of the vertical post 101A, 101B, 101C, that are between the bottom end 118 and top end 119 may be in the same linear axis as the bottom end 118 and top end 119.

In some embodiments, a vertical post 101A, 101B, 101C, may comprise one or more of a square, a round, or polygonal cross-section. For example, a vertical post 101A, 101B, 101C, may comprise an elongated rectangular prism shape, an elongated round tubular or cylindrical shape, or an elongated polygonal prism shape. In further embodiments, a vertical post 101A, 101B, 101C, may be configured in any shape, including combinations of shapes, and may be configured in any size.

In some embodiments, a vertical post 101A, 101B, 101C, may comprise one or more post cavities 122 which may extend through the central portion of the vertical post 101A, 101B, 101C, so that all or portions of the vertical post 101A, 101B, 101C, may be generally hollow or tubular in configuration. A post cavity 122 may be configured in any size and shape. Preferably, a post cavity 122 may be configured to receive wiring, portions of surveillance cameras 104A, 104B, portions of Auxiliary Infrared (IR) illuminators 108A, 108B, etc., so that they may be positioned within the post 101A, 101B, 101C.

The assembly 100A, 100B, 100C, may comprise at least one, and more preferably two or more surveillance cameras 104A, 104B. In preferred embodiments, a surveillance camera 104A, 104B, may comprise a digital camera that encodes images and videos digitally on a charge-coupled device (CCD) image sensor or on a complementary metal-oxide-semiconductor (CMOS) image sensor and stores them for later reproduction. In other embodiments, a camera 30A may comprise any type of camera which includes an optical system, typically using a lens 120A, 120B, with a variable diaphragm to focus light or other electromagnetic radiation, such as infrared radiation, onto an image pickup device or image sensor. Generally, a surveillance camera 104A, 104B may be configured to record still images or video images of the environment around the assembly 100A, 100B, 100C, and preferably of the environment generally located in front of the camera lens 120A, 120B, of the surveillance camera 104A, 104B. In some embodiments, a surveillance camera 104A, 104B, may include one or more IR emitting surfaces through which an IR light emitting element may emit IR light, such as to overcome more challenging image recording conditions. For example, a surveillance camera 104A, 104B, may include an IR emitting surface that surrounds the camera lens.

A surveillance camera 104A, 104B, may be coupled to any element of the device 100 with any suitable coupling method or device. In some embodiments, a surveillance camera 104A, 104B, may be movably coupled to a vertical post 101A, 101B, 101C, so that the surveillance camera 104A, 104B, may be movable or repositionable relative to the vertical post 101A, 101B, 101C, such as with 3-axis articulation, preferably at 45 degree angles, or any other angles, in relation to the direction of vehicular traffic 128 that is proximate to the assembly 100A, 100B, 100C. In preferred embodiments, an assembly 100A, 100B, 100C, may comprise one or more camera mount assemblies 500A, 500B, which may movably couple a surveillance camera 104A, 104B, to a vertical post 101A, 101B, 101C. For example, a first camera mount assembly 500A may movably couple a first surveillance camera 104A to a vertical post 101A, 101B, 101C, and a second camera mount assembly 500B may movably couple a second surveillance camera 104B to the vertical post 101A, 101B, 101C. In some embodiments, a camera mount assembly 500A, 500B, may comprise a mounting plate 501A, 501B, having a mounting plate aperture 502 and one or more plate fastener apertures 503 with one or more plate fasteners 504 which may be configured to couple the mounting plate 501A, 501B, to the vertical post 101A, 101B, 101C. The body of the surveillance camera 104A, 104B, may be generally spherical in shape having a diameter that is larger than the diameter of the mounting plate aperture 502 and a camera aperture 105, 105A, 105B, formed into the vertical post 101A, 101B, 101C, so that the body of the surveillance camera 104A, 104B, may be held between the mounting plate aperture 502 and camera aperture 105, 105A, 105B, by coupling the mounting plate 501A, 501B, to the vertical post 101A, 101B, 101C, via coupling the plate fasteners 504 to the vertical post 101A, 101B, 101C, through the plate fastener apertures 503 so that the body of the surveillance camera 104A, 104B, may be able to pivot and rotate with 3-axis articulation (x, y, and z-axis) while being coupled to the vertical post 101A, 101B, 101C. Optionally, the device 100 may comprise one or more mounting plate grommets 505 which may be coupled to and cover the heads of the plate fasteners 504.

Figure 11:
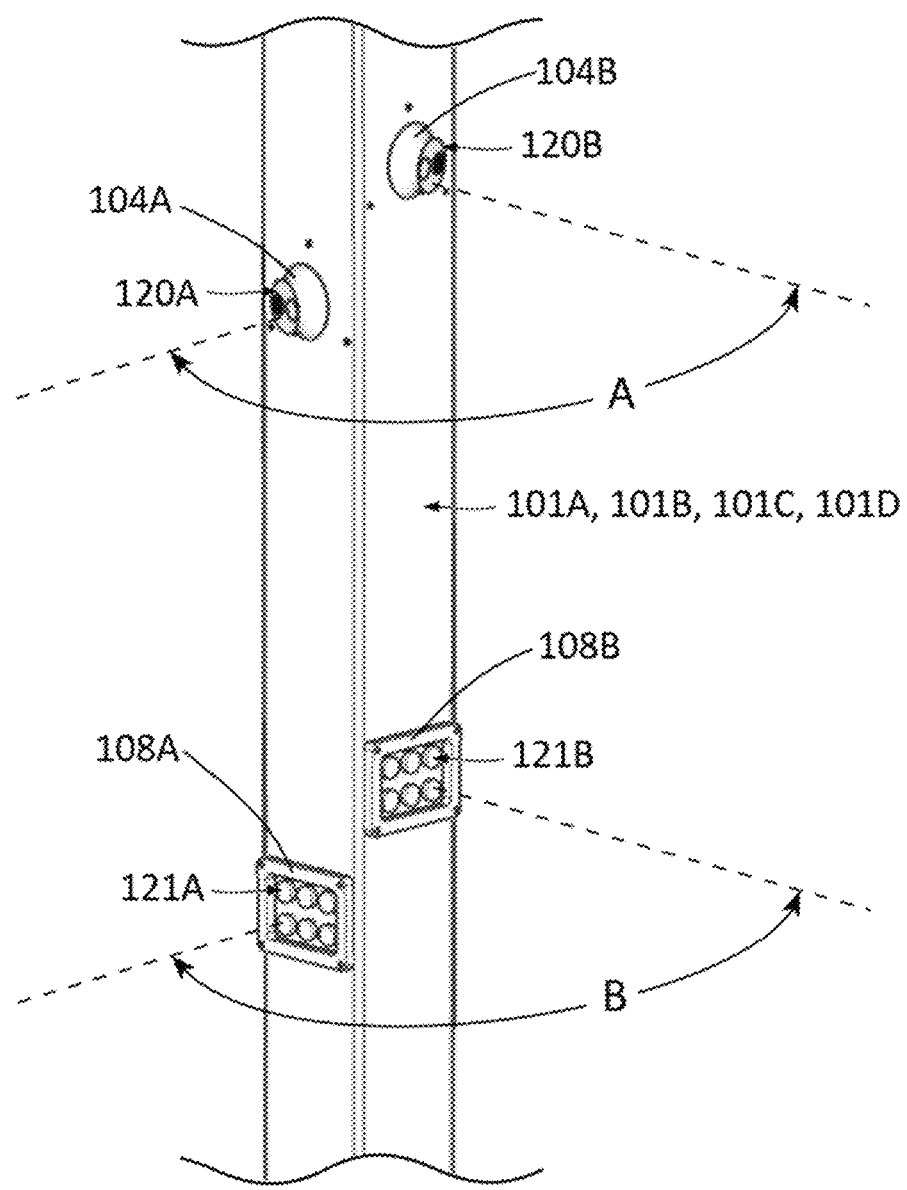
FIG. 11 is a perspective view of an example vertical post of a Novel Versatile Video Surveillance and Alarm Signaling Assembly, according to preferred embodiments of the present invention described herein.

In preferred embodiments, the assembly 100A, 100B, 100C, may comprise a first surveillance camera 104A having a first camera lens 120A and a second surveillance camera 104B having a second camera lens 120B, and the first camera lens 120A and second camera lens 120B may be angled between 75 and 200 degrees relative to each other as shown with Angle A in FIG. 11. In some embodiments, the first camera lens 120A and second camera lens 120B may be angled between 160 and 200 degrees, and more preferably angled between 170 and 190 degrees, such as approximately 180 degrees, by coupling the cameras 104A, 104B to opposing sides of a vertical post 101A, 101B, 101C. In further embodiments, Angle A may be between 75 and 120 degrees, more preferably between 80 and 110 degrees, and more preferably between 80 and 100 degrees. In more preferred embodiments, Angle A may be between 85 and 95 degrees, and even more preferably, Angle A may be substantially 90 degrees.

The assembly 100A, 100B, 100C, may optionally comprise one or more auxiliary illuminators 108A, 108B, which may be configured to output one or more wavelengths of light through its light emitting surface 121A, 121B, which may be recordable by a surveillance camera 104A, 104B. In some embodiments, an auxiliary illuminators 108A, 108B, may comprise a light emitting diode (LED) which may be configured to provide light of various wavelengths and intensities. In other embodiments, an auxiliary illuminators 108A, 108B, may comprise an organic light-emitting diode (OLED), incandescent light bulb, fluorescent light, bulb halogen light bulb, high-intensity discharge light bulb, laser light emitter, electroluminescent light source, neon light source, or any other type of suitable light source. In preferred embodiments, one or more auxiliary illuminators 108A, 108B, may be configured to emit infrared light e.g., electromagnetic radiation (EMR) with wavelengths of 700 nanometers to 1.0 millimeters.

An auxiliary illuminator 108A, 108B, may be coupled to any element of the assembly 100A, 100B, 100C with any suitable coupling method or device. In some embodiments, one or more auxiliary illuminators 108A, 108B, may be coupled to a vertical post 101A, 101B, 101C. In preferred embodiments, a vertical post 101A, 101B, 101C, may comprise one or more auxiliary illuminator apertures 109A, 109B, which may extend through the vertical post 101A, 101B, 101C, so as to be in communication with the post cavity 120, and a rear portion of an auxiliary illuminator 108A, 108B, may be positioned through an auxiliary illuminator aperture 109A, 109B, and into the post cavity 120 with one or more auxiliary illuminator fasteners 110 coupling the auxiliary illuminator 108A, 108B, to the vertical post 101A, 101B, 101C, by extending through one or more auxiliary illuminator fastener apertures 111 in the vertical post 101A, 101B, 101C.

Preferably, the assembly 100A, 100B, 100C, may include one or more auxiliary illuminators 108A, 108B, which may be coupled to a vertical post 101A, 101B, 101C, at 45 degree angles, or any other angles, in relation to vehicular traffic direction 128 that may be proximate to the device 100. In preferred embodiments, the assembly 100A, 100B, 100C, may comprise a first auxiliary illuminator 108A having a first light emitting surface 121A and a second auxiliary illuminator 108B having a second light emitting surface 121B, and the first light emitting surface 121A and second light emitting surface 121B may be angled between 75 and 105 degrees relative to each other as shown with Angle B in FIG. 11. In some embodiments, the light emitting surface 121A and second light emitting surface 121B may be angled between 160 and 200 degrees, and more preferably angled between 170 and 190 degrees, such as approximately 180 degrees, by coupling the auxiliary illuminators 108A, 108B to opposing sides of a vertical post 101A, 101B, 101C. In further embodiments, Angle B may be between 75 and 120 degrees, more preferably between 80 and 110 degrees, and more preferably between 80 and 100 degrees. In more preferred embodiments, Angle B may be between 85 and 95 degrees, and even more preferably, Angle B may be substantially 90 degrees.

In some embodiments, and as shown in FIGS. 1A-1G, the assembly 100A, 100B, 100C, may comprise a mailbox support arm 102 that may be coupled to a vertical post 101A, 101B, 101C, and the mailbox support arm 102 may be configured to support or otherwise be coupled to a mailbox 117. Preferably, a mailbox support arm 102 may be coupled to a vertical post 101A, 101B, 101C, so that the mailbox support arm 102 may be generally horizontal in orientation. A mailbox support arm 102 may be configured in any size and shape. In some embodiments, a mailbox support arm 102 may comprise a proximal end 124 and a distal end 125. In preferred embodiments, a mailbox support arm 102 may comprise a linear shape so that portions of the vertical post 101A, 101B, 101C, that are between the proximal end 124 and distal end 125 may be in the same linear axis as the proximal end 124 and distal end 125. In further preferred embodiments, the device 100 may comprise a mailbox support arm 102 that may be linear in shape and which may coupled to a linear shaped vertical post 101 so that the mailbox support arm 102 and vertical post 101 are substantially perpendicular to each other.

A mailbox support arm 102 may be coupled to a vertical post 101A, 101B, 101C, via any suitable coupling method. In preferred embodiments, a vertical post 101A, 101B, 101C, may comprise one or more support arm apertures 103 which may be sized and shaped to enable portions of a mailbox support arm 102 to be inserted into and through the support arm apertures 103. In further embodiments, a mailbox support arm 102 may be coupled to a vertical post 101A, 101B, 101C, via brackets, fasteners, such as screws, rivets, etc., adhesive, by being molded together, etc.

In preferred embodiments, the assembly 100A, 100B, 100C, may comprise a mailbox 117, such as a curbside mailbox, also known as rural mailbox. Mailboxes 117 generally comprise a large metal, plastic, wood, etc., box mounted on a support designed primarily to receive large quantities of incoming mail, often with an openable and closable door 126 and an attached flag to signal the presence of outgoing mail to the mail carrier.

Figure 1B:
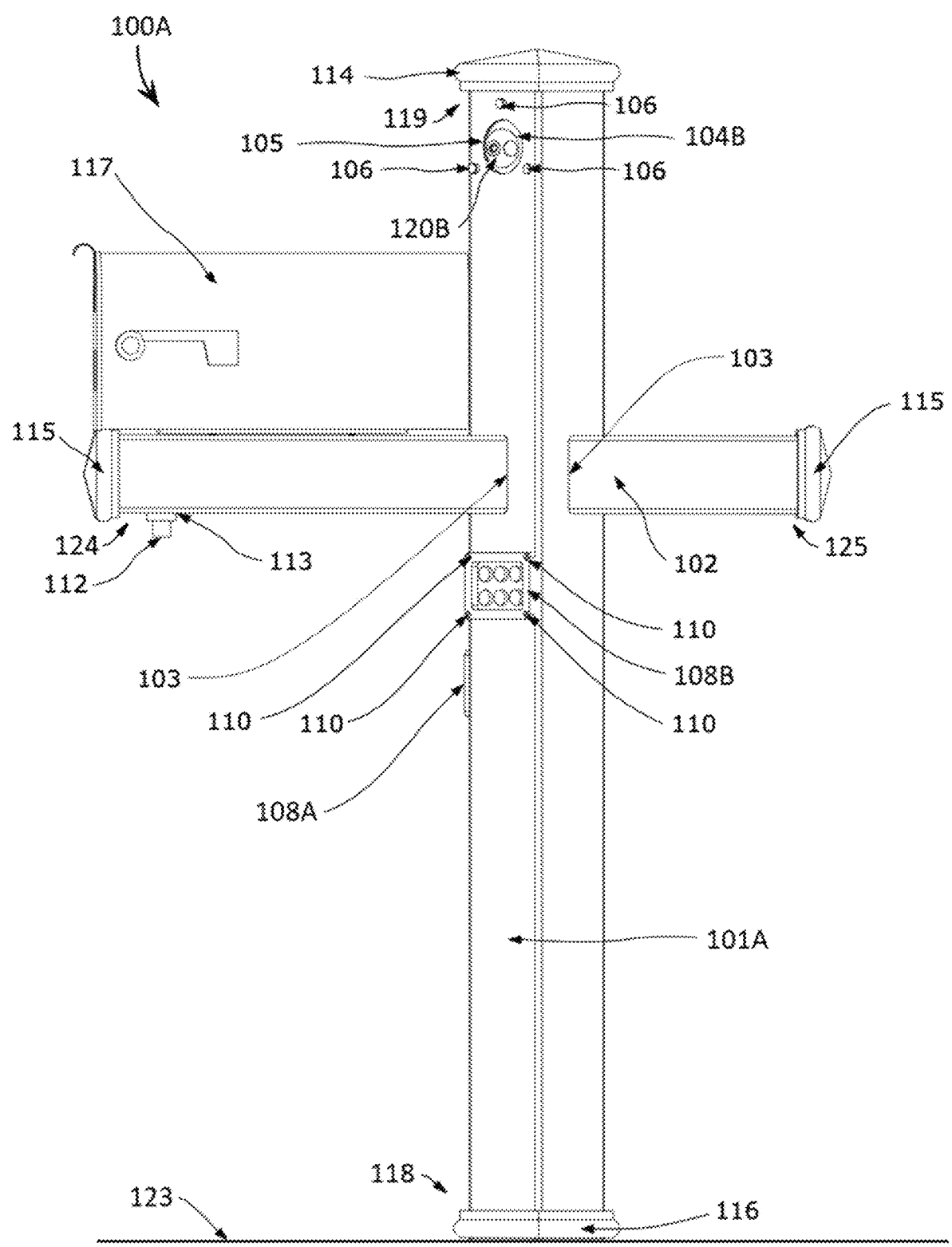
FIG. 1B is a left side view illustration of an example a novel Versatile Video Surveillance and Alarm Signaling Assembly, according to preferred embodiments of the present invention described herein.
Figure 1C:
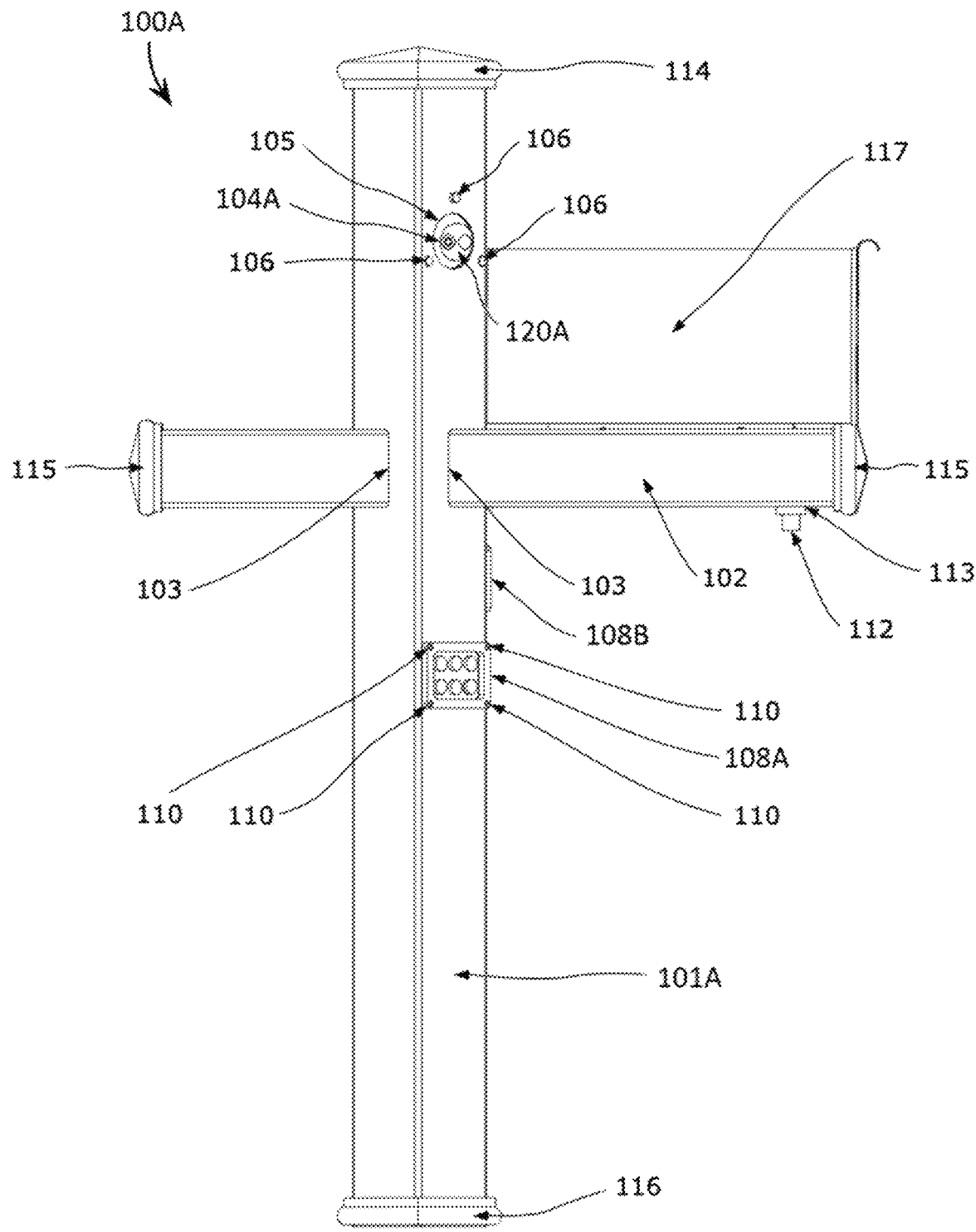
FIG. 1C is a right side view illustration of an example of a novel Versatile Video Surveillance and Alarm Signaling Assembly, according to preferred embodiments of the present invention described herein.
Figure 1D:
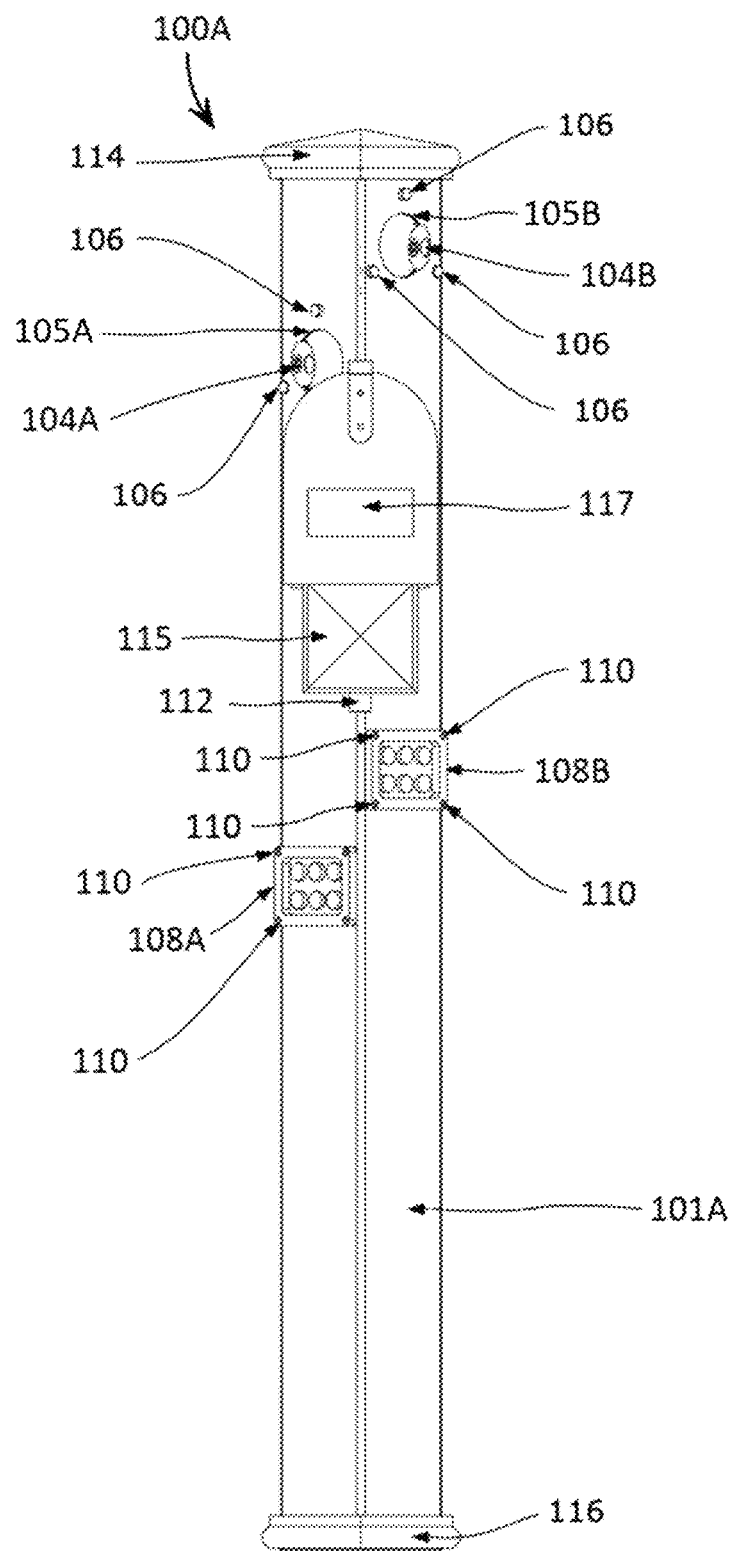
FIG. 1D is a front view illustration of an example of a novel Versatile Video Surveillance and Alarm Signaling Assembly, according to preferred embodiments of the present invention described herein.
Figure 1E:
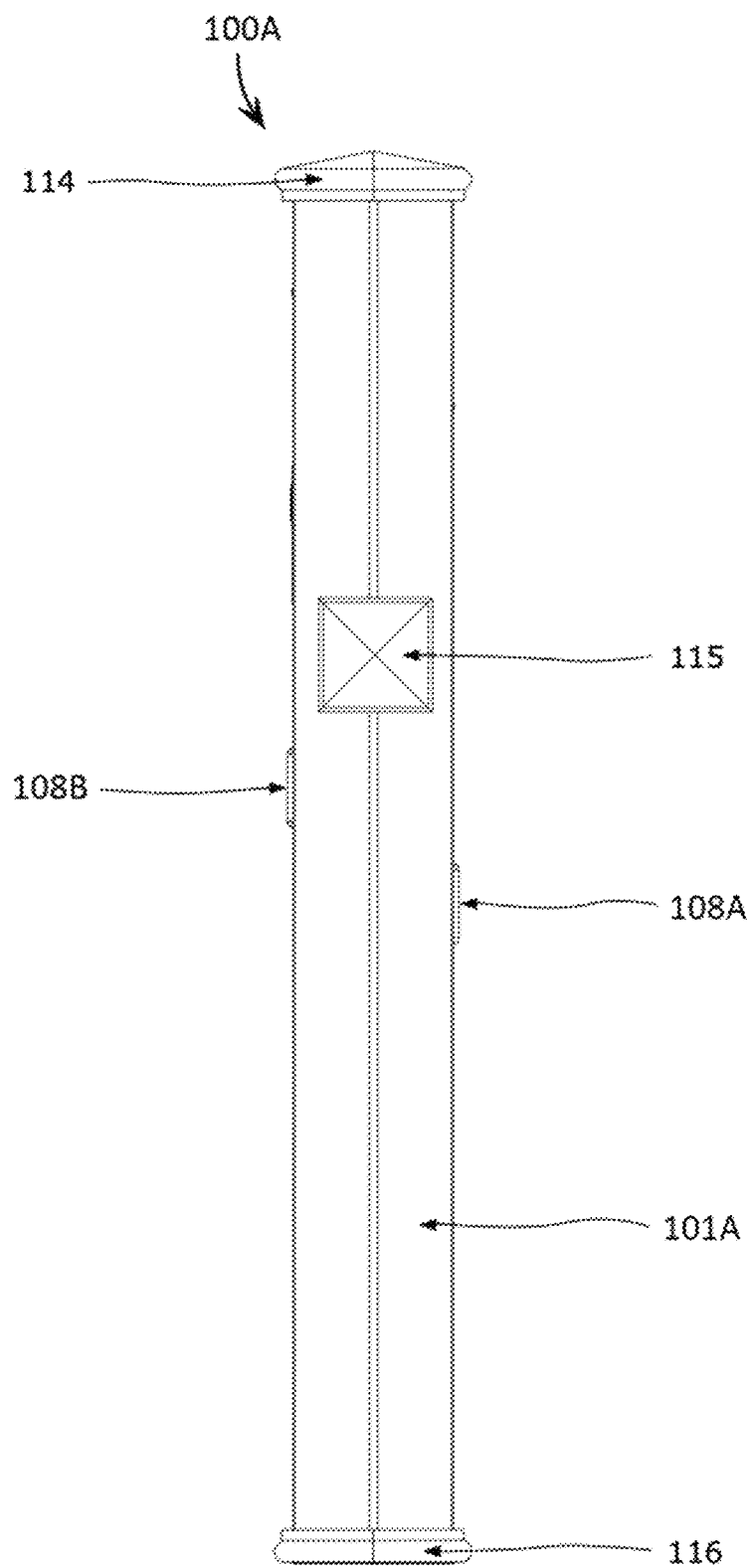
FIG. 1E is a rear view illustration of an example of novel Versatile Video Surveillance and Alarm Signaling Assembly, according to preferred embodiments of the present invention described herein.
Figure 1F:
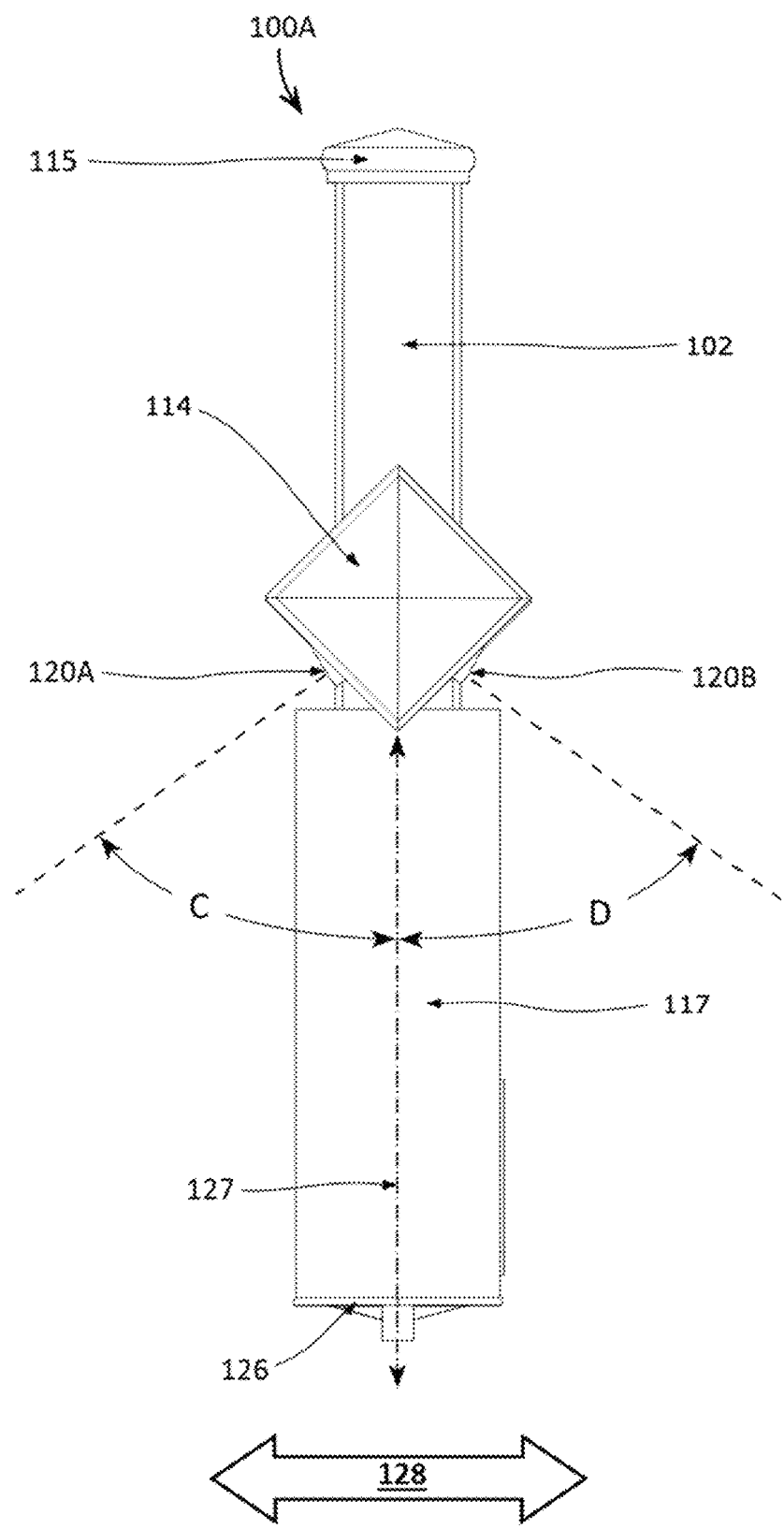
FIG. 1F is a top view illustration of an example of a novel Versatile Video Surveillance and Alarm Signaling Mailbox Assembly, according to preferred embodiments of the present invention described herein.

A mailbox 117 may comprise a mail axis 127 (FIG. 1F) which may generally extend through the door 126 and bisect the mailbox 117 in a direction that is substantially perpendicular to the door 126 (FIG. 1F). In some embodiments, the assembly 100A, 100B, 100C, may comprise a mailbox 117 that may be coupled to the vertical post 101A, 101B, 101C, optionally by being coupled to a mailbox support arm 102 that is coupled to the vertical post 101A, 101B, 101C, so that a first camera lens 120A of a first surveillance camera 104A may be angled relative to the mail axis 127 as shown with Angle C (FIG. 1F). In preferred embodiments, Angle C may be approximately between 30 and 100 degrees, more preferably between 40 and 95 degrees, such as substantially 45 degrees or substantially 90 degrees. In still further embodiments, the assembly 100A, 100B, 100C, may comprise a mailbox 117 that may be coupled to the vertical post 101A, 101B, 101C, so that a second camera lens 120B of a second surveillance camera 104B may be angled relative to the mail axis 127 as shown with Angle D (FIG. 1F). In preferred embodiments, Angle D may be approximately between 30 and 100 degrees, more preferably between 40 and 95 degrees, such as substantially 45 degrees or substantially 90 degrees.

In preferred embodiments, the assembly 100A, 100B, 100C, enables an inconspicuous, decorative and versatile street-side video surveillance assembly to capture images of vehicle details, license plates, number plates, vehicle occupants, pedestrians, alphanumeric codes or visual codes in daylight, challenging lighting conditions or total darkness and may be configured in various embodiments, such as a mailbox post assembly 100A (FIGS. 1A-1G), an address post assembly 100B (FIG. 2), a sign post assembly 100C (FIG. 3), and other posts variations preferably being comprised of: a hollow vertical post 101A, 101B, 101C, said vertical post 101A, 101B, 101C, preferably comprising a square, a round, or polygonal cross-section with a plurality of apertures 103, 105, 105A, 105B, 107, 109A, 109B, 111, adapted to receive elements, such as infrared (IR) type surveillance camera 104A, 104B, infrared (IR) type auxiliary illuminators 108A, 108B, and related with auxiliary illuminator apertures 109A, 109B, adapted to receive auxiliary illuminator 108A, 108B, assemblies and, at least one auxiliary illuminator fastener 110 operatively engaging the vertical post 101A, 101B, 101C, and/or said auxiliary illuminator 108A, 108B, assemblies.

In further embodiments, a mailbox post assembly 100A may comprise: a vertical post 101A, 101B, 101C, being one of machined and/or molded plastic, fiberglass, wood, composite, steel, iron, aluminum, fiberglass, and other materials wherein said vertical post 101A, 101B, 101C, comprising a support arm aperture 103 receiving a mailbox support arm 102 of plastic, fiberglass, wood, composite, steel, iron, aluminum, fiberglass, and other materials, diagonally or perpendicularly intersected with said vertical post 101A, 101B, 101C, said mailbox support arm 102 attaining a perpendicular orientation, or any other orientation, to the direction of traffic 128 that is proximate to the mailbox post assembly 100A supporting a mailbox 117, therefore facilitating mail delivery while enabling the mailbox post assembly 100A, to capture street-side video surveillance of vehicle details, license plates, number plates, vehicle occupants, pedestrians, alphanumeric codes or visual codes, while also serving as a residential mailbox post assembly 100A.

The present invention may be configured with or without a mailbox support arm 102 in various post lengths, apertures, attachments, surveillance camera assemblies 104A, 104B, and auxiliary illuminators 108A, 108B, in various embodiments, such as a mailbox post assembly 100A, address display post assembly 100B, sign post assembly 100C, or other post variations.

FIG. 1A—FIG. 1A illustrates a perspective view of a post assembly 100A, 100B, 100C, in a preferred embodiment of a mailbox post assembly 100A. Preferred embodiments of the mailbox vertical post 101A may be include cuts and apertures 103, 105, 105A, 105B, 107, 109A, 109B, 111, to allow mounting of surveillance cameras 104A, 104B, and auxiliary illuminators 108A, 108B, preferably at 45 degree angles, or any other angles, perpendicular or parallel in relation to vehicular traffic direction 128 or other areas of interest.

FIG. 1A—In preferred embodiments of the present invention, camera integrated or auxiliary illuminators 108A, 108B, may comprise infrared (IR) type illuminators that emit light wavelengths, typically 730, 850 or 940 nanometers, that are invisible to human eye, but are visible to surveillance cameras 104A, 104B. Camera integrated or infrared (IR) auxiliary illuminators 108A, 108B, enable street-side infrared (IR) illumination and video capture of vehicle details, license plates, number plates, vehicle occupants, pedestrians, alphanumeric codes or visual codes, or any other alphanumeric or visual code in challenging lighting conditions or total darkness.

FIG. 1A—In preferred embodiments of the present invention, one or more support arm apertures 103 (FIG. 5) may support mounting of a mailbox support arm 102, preferably diagonally intersected with the mailbox vertical post 101A to support mounting surveillance cameras 104A, 104B, and auxiliary illuminators 108A, 108B, 108 at 45 degree angles in the vertical post 101A in relation to vehicle traffic direction 128. The mailbox support arm 102 may be perpendicular, parallel or any other angles enabling mounting of various mailboxes 117 using mailbox mounting plates and various fasteners/fastening methods designed to attach mailboxes 117 to mailbox support arms 102 therefore facilitating mail delivery while enabling the present invention to capture street-side video surveillance of vehicle details, license plates, number plates, vehicle occupants, pedestrians, alphanumeric codes or visual codes in challenging lighting conditions or total darkness.

FIG. 1A—In preferred embodiments of the present invention, a mailbox post assembly 100A may be installed in locations appropriate for mail or parcel delivery using common mailbox installation methods such as attaching the mailbox vertical post 101A to a post support embedded in a concrete footing or a vertical post section attached to a concrete footing with various fasteners/fastening methods.

FIG. 1A—In preferred embodiments of the present invention, the mailbox vertical post 101A can be finished with various styles of decorative caps 114 at the top end 119 and various styles of decorative bases 116 at the bottom end 118 where the mailbox vertical post 101A meets the ground surface 123. The mailbox support arm 102 can be finished with various styles of mailbox support arm decorative caps 115 at each end 124, 125. Various styles of decorative caps 114, 115 and bases 116 can be secured with adhesive, screws, or other fasteners/fastening methods.

FIG. 1A—In preferred embodiments of the present invention, the assembly 100A, 100B, 100C, may optionally include one or more alarm signaling lights 112 which may be optionally mounted on the mailbox support arm 102 and which may be connected to a signaling output of a burglar alarm, panic alarm, fire alarm, medical alert, or any other electronic notification system, enabling an inconspicuous, decorative and versatile street-side alarm signaling assembly, activated by signaling outputs of burglar alarm, panic alarm, fire alarm, medical alert, or any other electronic notification system, to alert first responders such as police, fire, or medical personnel to the exact postal address of an alarm.

FIG. 1B—FIG. 1B illustrates a left side view of a assembly 100A, 100B, 100C, in a preferred embodiment of a mailbox post assembly 100A, an example embodiment of the present invention.

FIG. 1C—FIG. 1C illustrates a right side view of a assembly 100A, 100B, 100C, in a preferred embodiment of a mailbox post assembly 100A, an example embodiment of the present invention.

FIG. 1D—FIG. 1D illustrates a front side view of a assembly 100A, 100B, 100C, in a preferred embodiment of a mailbox post assembly 100A, an example embodiment of the present invention. In this embodiment, Infrared (IR) type surveillance cameras 104A, 104B, and infrared (IR) type auxiliary illuminators 108A, 108B, are coupled to mailbox vertical post 101A preferably at 45 degree angles, or any other angles, in relation to vehicular traffic direction 128 thus enabling an inconspicuous and decorative street-side Versatile Video Surveillance and Alarm Signaling Assembly 100A, 100B, 100C, in a preferred embodiment of mailbox post assembly 100A.

FIG. 1E—FIG. 1E illustrates a rear view of a assembly 100A, 100B, 100C, in a preferred embodiment of a mailbox post assembly 100A, an example embodiment of the present invention.

FIG. 1F—FIG. 1F illustrates a top view of a assembly 100A, 100B, 100C, in a preferred embodiment of a mailbox post assembly 100A, an example embodiment of the present invention.

Figure 1G:
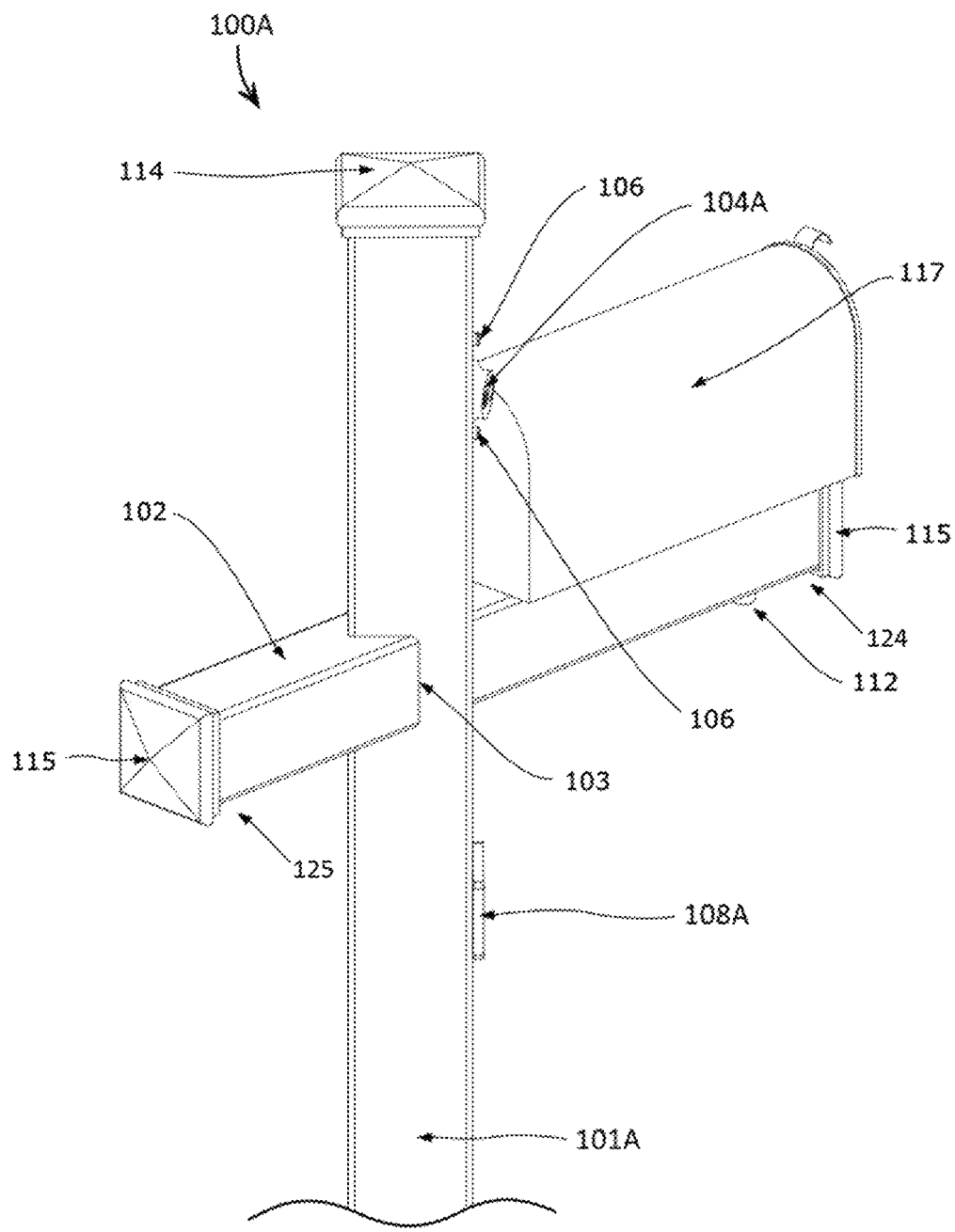
FIG. 1G is a right-rear perspective view illustration of an example of a novel Versatile Video Surveillance and Alarm Signaling Assembly, according to preferred embodiments of the present invention described herein.

FIG. 1G—FIG. 1G illustrates a rear perspective view of a assembly 100A, 100B, 100C, in a preferred embodiment of a mailbox post assembly 100A, an example embodiment of the present invention. This illustration demonstrates detail of support arm aperture 103 that support a diagonal intersection of a mailbox support arm 102 and mailbox post assembly 100A enabling mounting and positioning of infrared (IR) type surveillance cameras 104A, 104B, and infrared (IR) type auxiliary illuminators 108A, 108B, preferably at 45 degree angles, or any other angles, in relation to vehicle traffic direction 128.

Figure 2:
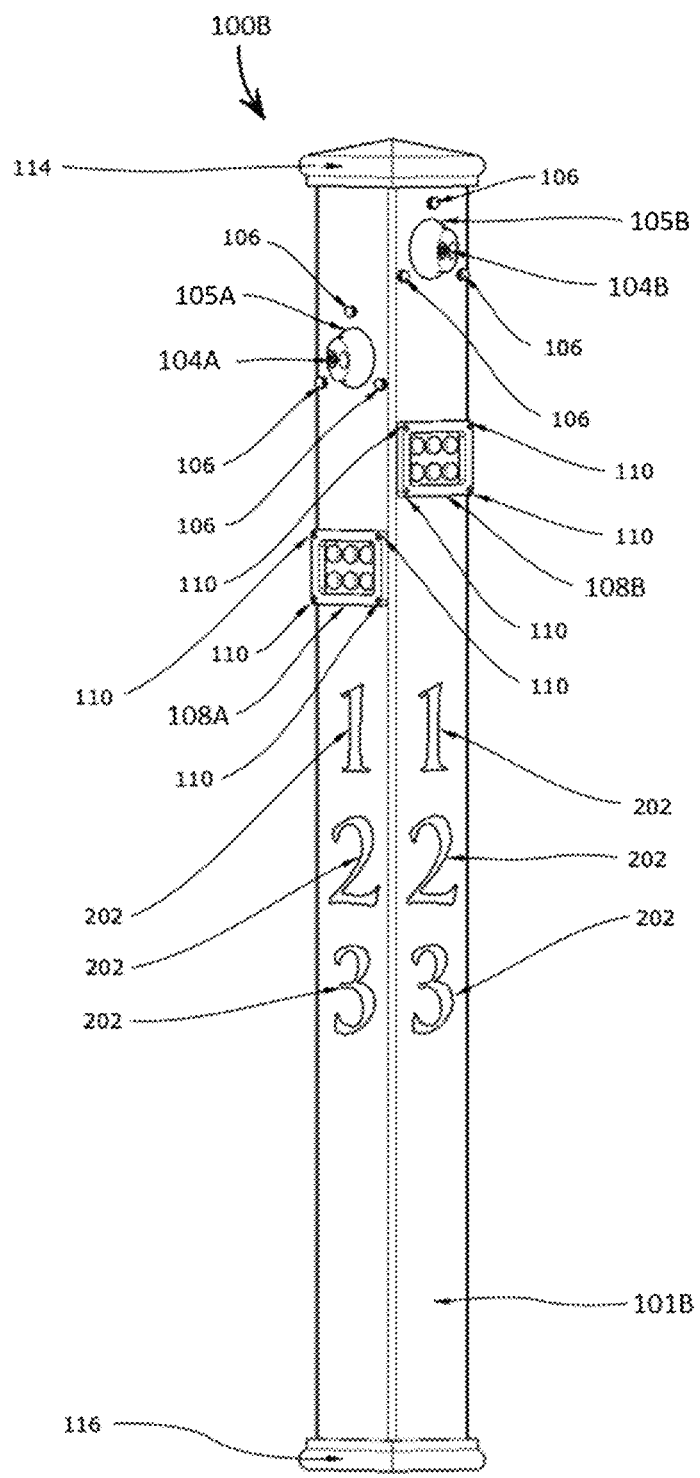
FIG. 2 is a front view illustration of an example novel Versatile Video Surveillance and Alarm Signaling Assembly, according to preferred embodiments of the present invention described herein.

FIG. 2—FIG. 2 illustrates a front view of a novel Versatile Video Surveillance and Alarm Signaling Assembly in a preferred embodiment of an address post assembly 100B, another example embodiment of the present invention. Address numbers 202 or any other identifying characters, symbols or signs may be attached to an address post vertical post 101B. The address post assembly 100B may include one or more surveillance cameras 104A, 104B, and auxiliary illuminators 108A, 108B, that may be coupled to the address post vertical post 101B. The address post vertical post 101B can be finished with various styles of decorative caps 114 and decorative bases 116.

Figure 3:
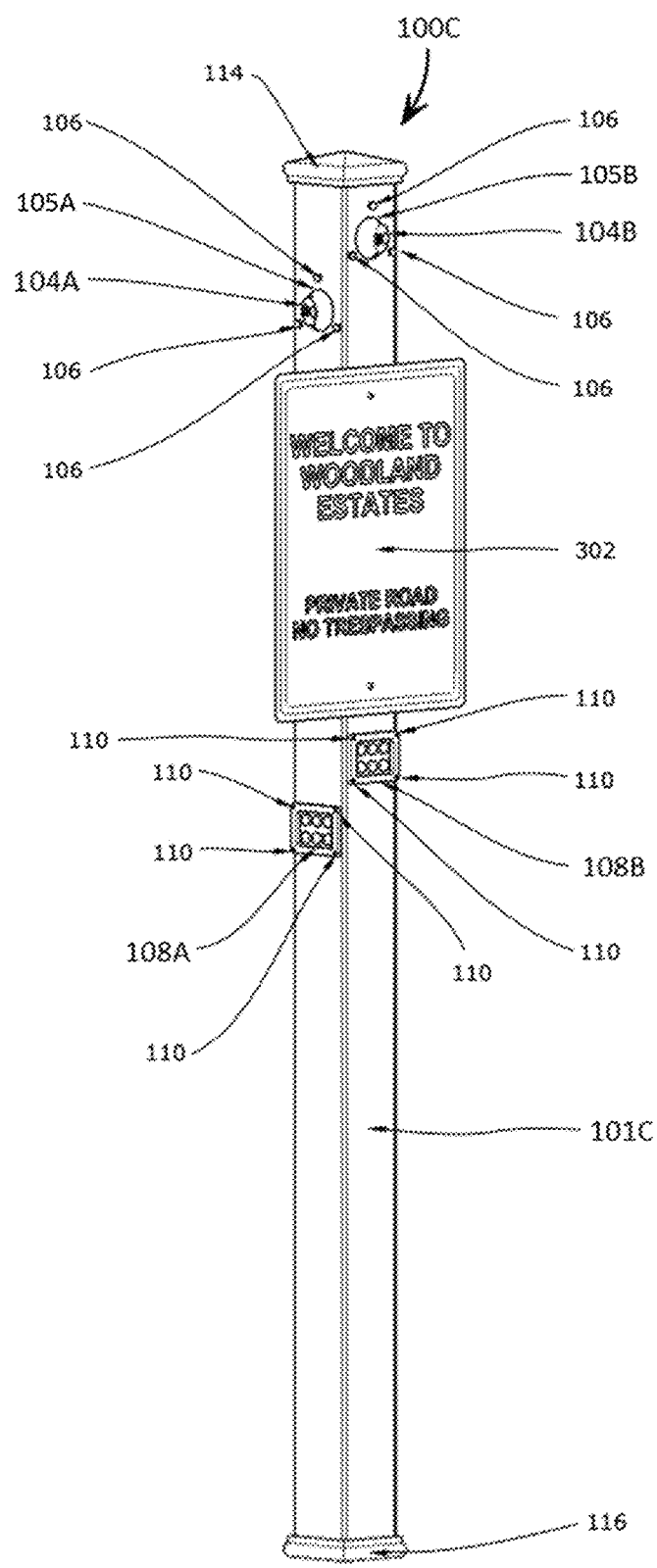
FIG. 3 is a front view illustration of an example of a novel Versatile Video Surveillance and Alarm Signaling Assembly, according to preferred embodiments of the present invention described herein.

FIG. 3—FIG. 3 illustrates a front view of a novel Versatile Video Surveillance and Alarm Signaling Post in a preferred embodiment of a sign post assembly 100C, another example embodiment of the present invention. Signage 302 may be attached to a sign post vertical post 101C with various fasteners and fastening methods. The sign post assembly 100C may include one or more surveillance cameras 104A, 104B, and auxiliary illuminators 108A, 108B, that may be coupled to the sign post vertical post 101C. The sign post vertical post 101C can be finished with various styles of decorative caps 114 and decorative bases 116.

Figure 4:
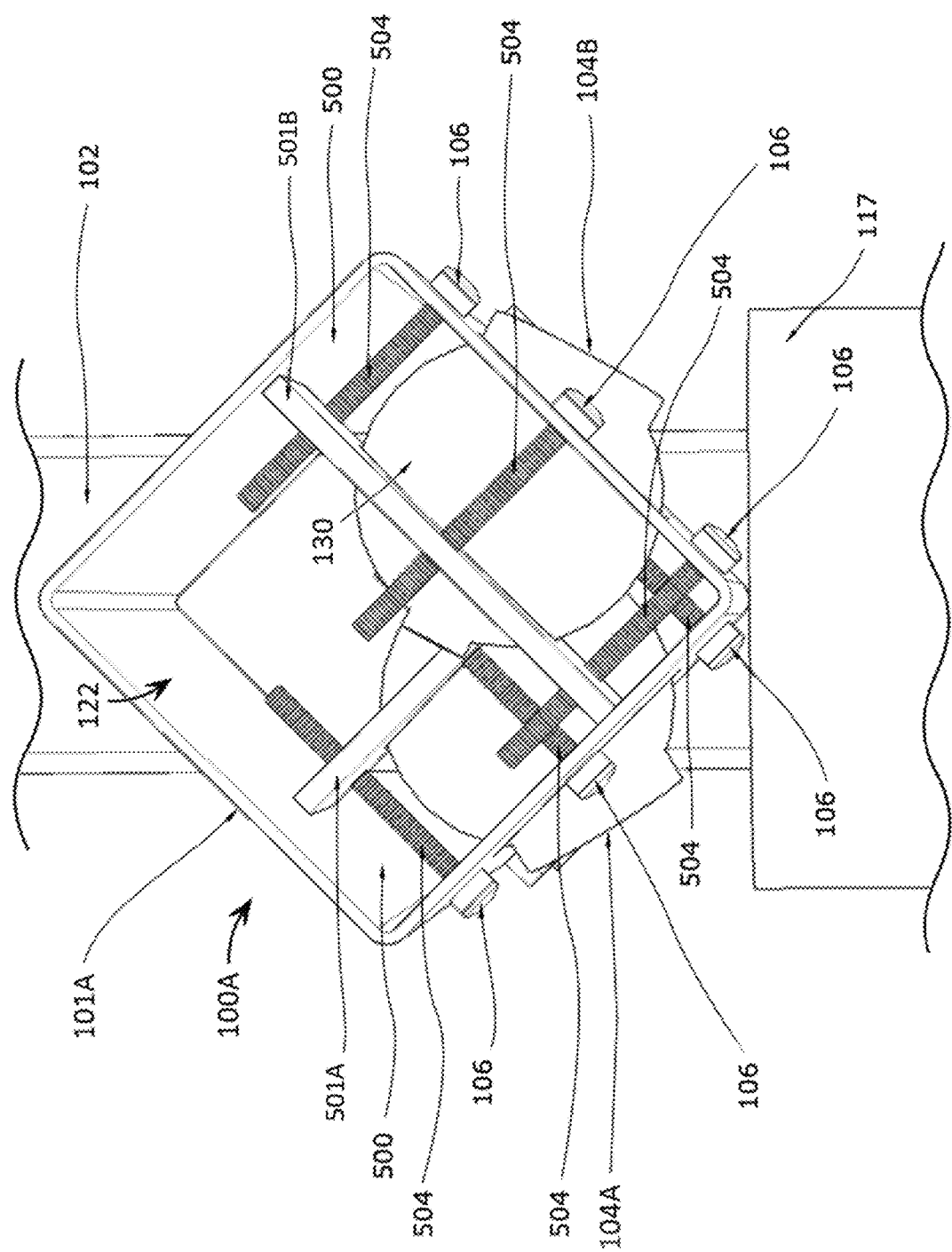
FIG. 4 is an enlarged top view illustration of preferred example components of a novel Versatile Video Surveillance and Alarm Signaling Assembly, according to preferred embodiments of the present invention described herein.

FIG. 4—FIG. 4 illustrates a top view of preferred example components of a mailbox post assembly 100A while the following description is also applicable to the other post assemblies 100B, 100C, described herein. Infrared (IR) surveillance cameras 104A, 104B, may be mounted using a camera mount assembly 500 designed to fit internally and externally of the vertical post 101A, 101B, 101C, enabling the infrared (IR) surveillance cameras 104A, 104B, to be affixed within the camera aperture 105, 105A, 105B, using various fasteners/fastening methods 504. This enables various infrared (IR) surveillance cameras 104A, 104B, to utilize the 45 degree angles, or any other angles, of the vertical post 101A, 101B, 101C, while also enabling 3-axis camera articulation of infrared (IR) vertical post 101A, 101B, 101C, for optimal street-side views in varying terrain and angles. Various camera styles may be accommodated by mounting internally and/or externally or for optimal placement.

Figure 5:
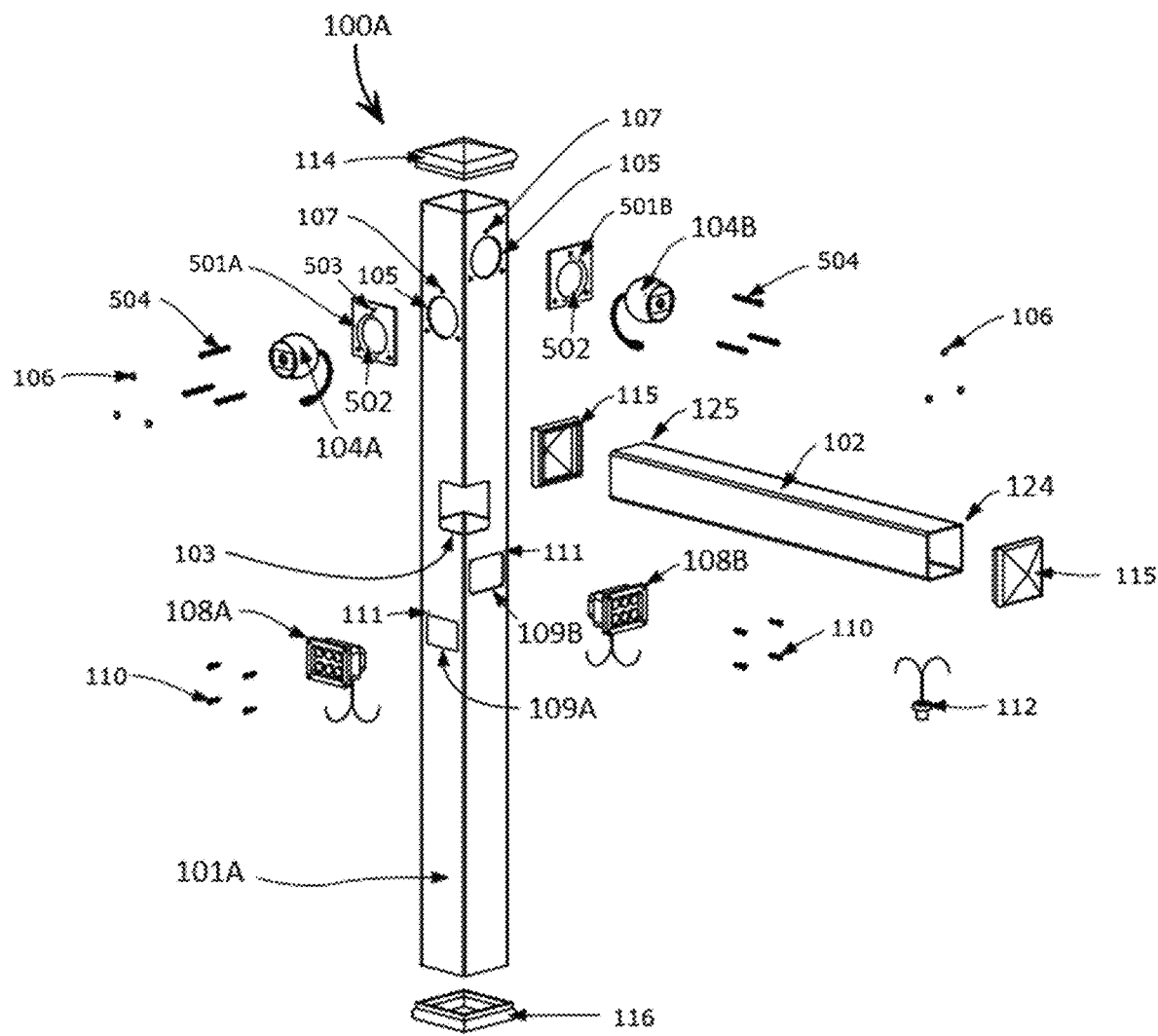
FIG. 5 is an exploded view illustration of preferred example camera mount components of a novel Versatile Video Surveillance and Alarm Signaling Assembly, according to preferred embodiments of the present invention described herein.

FIG. 5—FIG. 5 illustrates an exploded view of a novel Versatile Video Surveillance and Alarm Signaling Assembly in a preferred embodiment of a mailbox post assembly 100A.

Figure 6:
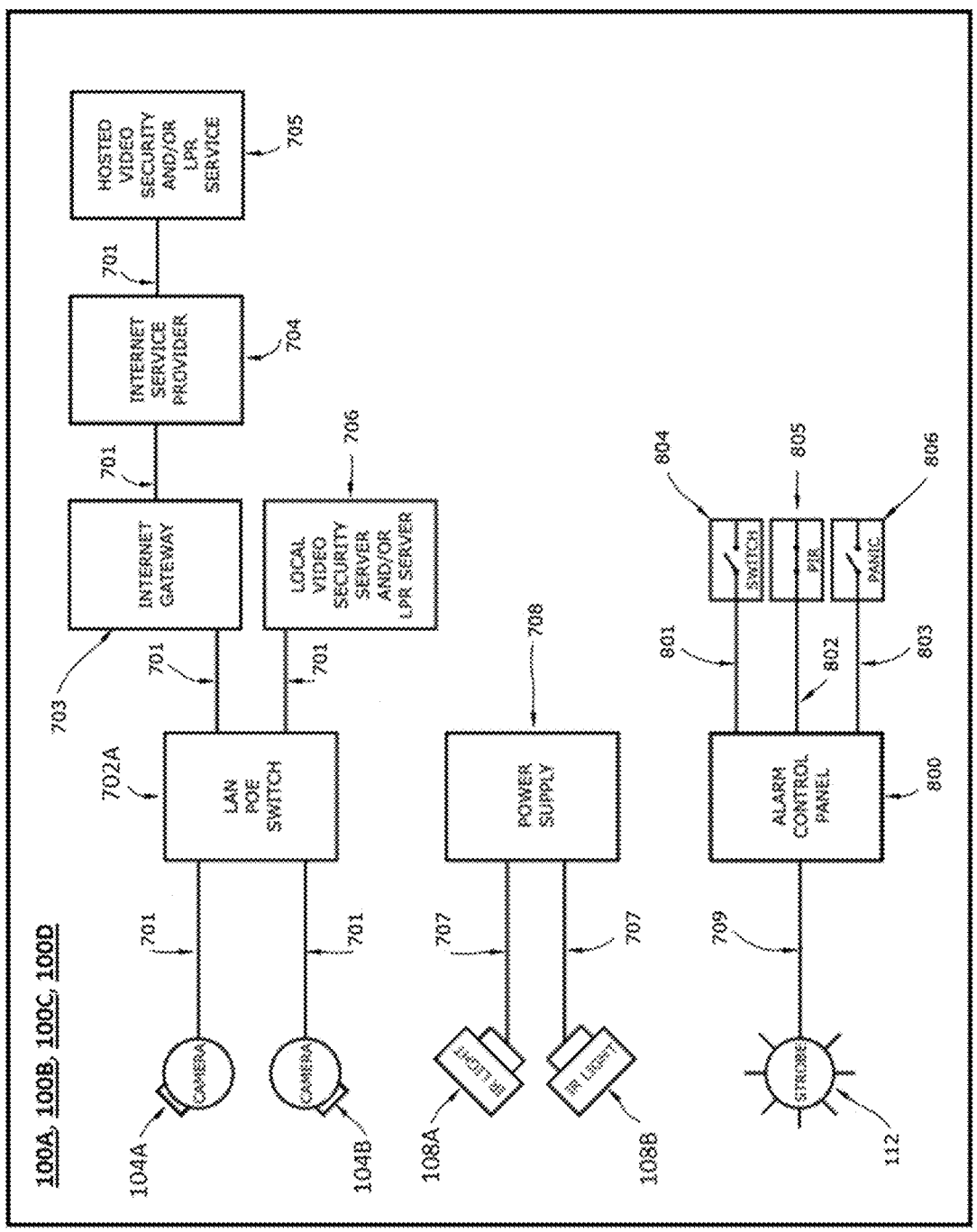
FIG. 6 is a block diagram of an example hardwired architecture of a novel Versatile Video Surveillance and Alarm Signaling Assembly, according to preferred embodiments of the present invention described herein.
Figure 7:
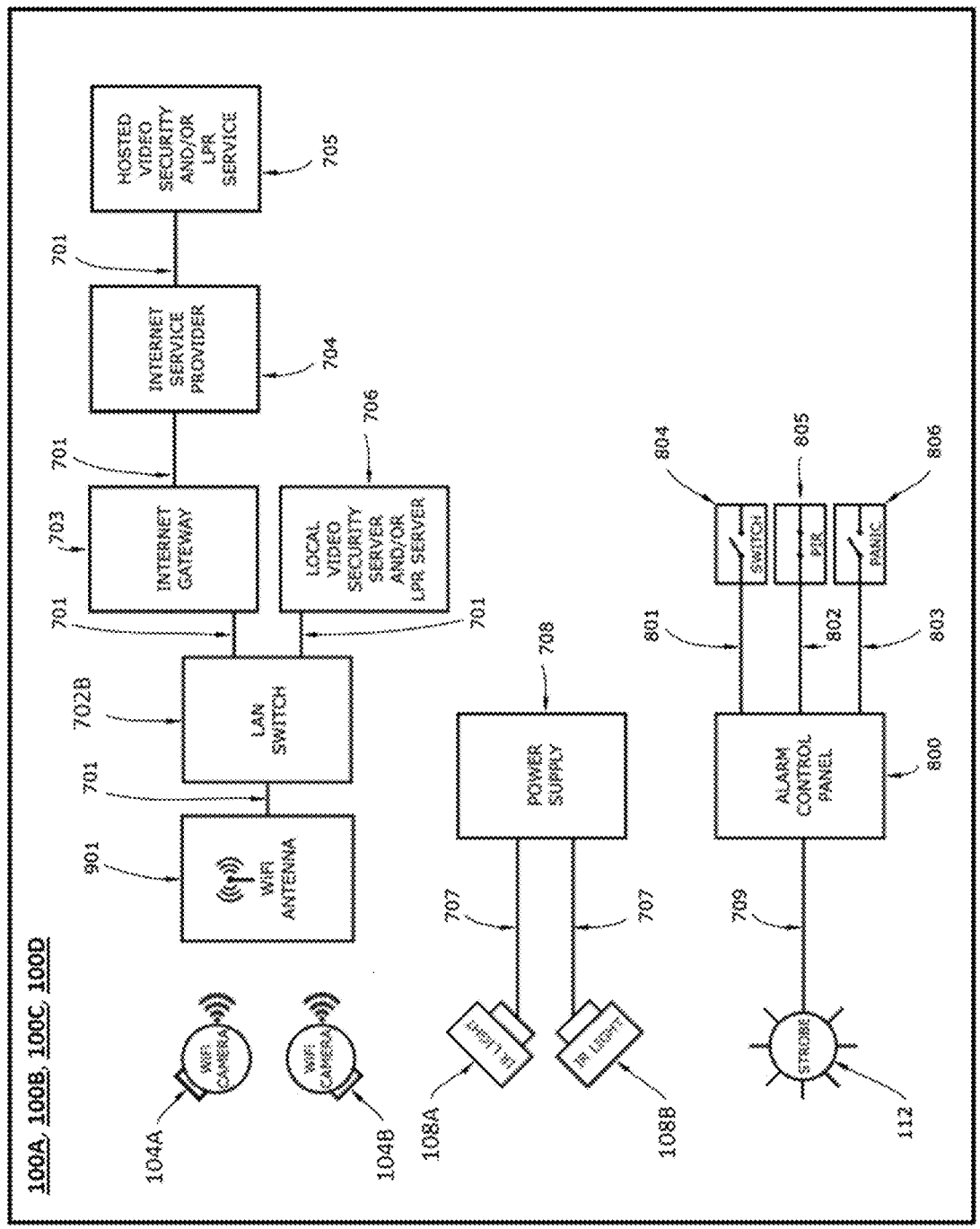
FIG. 7 is a block diagram of an example WiFi architecture of a novel Versatile Video Surveillance and Alarm Signaling Assembly, according to preferred embodiments of the present invention described herein.
Figure 8:
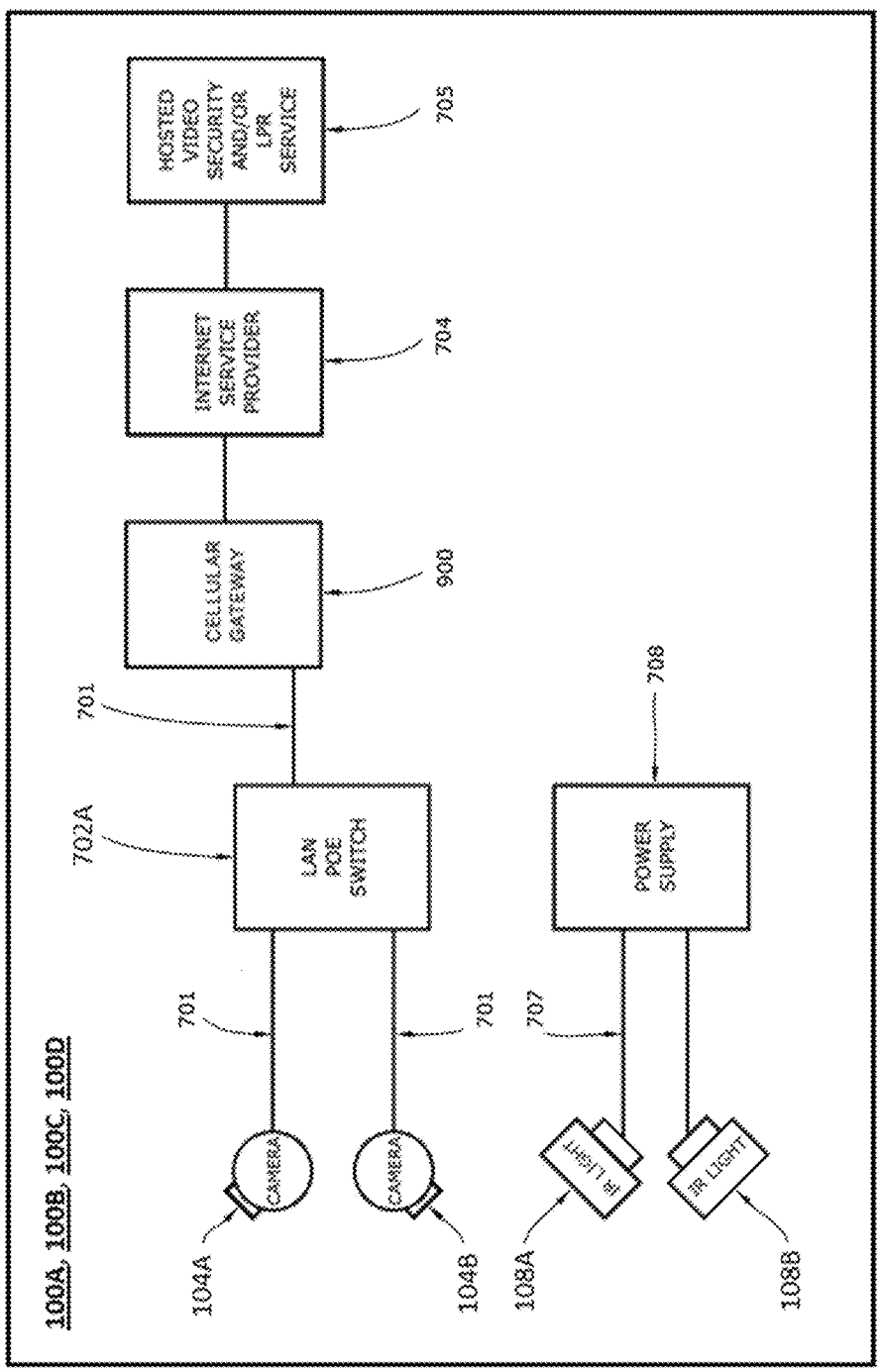
FIG. 8 is a block diagram of an example cellular architecture of a novel Versatile Video Surveillance and Alarm Signaling Assembly, according to preferred embodiments of the present invention described herein.

FIGS. 6, 7, and 8 illustrate block diagrams of novel Versatile Video Surveillance and Alarm Signaling Assemblies 100A, 100B, 100C, according to various embodiments described herein.

FIG. 6—FIG. 6 illustrates an example embodiment of a hardwired data communication configuration of an assembly 100A, 100B, 100C. Connectivity and power for surveillance cameras 104A, 104B, may be supplied via category LAN cable 701 connected to a PoE (power-over-ethernet) switch type of network interface 702A enabling connectivity to a local video security server and/or LPR server 706 or internet connectivity via an internet gateway 703 and internet service provider 704 sending images generated by surveillance cameras 104A, 104B, to a hosted video security and/or LPR service 705.

FIG. 7—FIG. 7 illustrates an example embodiment of a wireless (WiFi) data communication configuration of an assembly 100A, 100B, 100C. Data connectivity for WiFi enabled surveillance cameras 104 are supplied via WiFi access antenna access points 901 connected to a LAN switch type of network interface 702B enabling connectivity to a local video security server and/or LPR server 706 or internet connectivity via an internet service provider 704 sending images to a hosted video security and/or LPR service 705. Camera 104A, 104B, power may be supplied via local power supply, solar power source, or other method.

FIG. 8—FIG. 8 illustrates an example of a cellular data communication configuration of an assembly 100A, 100B, 100C. Surveillance cameras 104A, 104B, may be connected to a LAN/PoE switch type of network interface 702A via category LAN cable 701. The LAN/PoE switch network interface 702A may be connected to a cellular gateway 900 enabling internet connectivity via an internet service provider 704 sending images to a hosted video security and/or LPR service 705.

FIGS. 6, 7, and 8—Power for auxiliary illuminators 108A, 108B, may be supplied via Multi-conductor cable 707 connected to a low-voltage power supply 708 or any other suitable power source or method.

FIGS. 6 and 7—In preferred embodiments, the assembly 100A, 100B, 100C, of the present invention may include one or more alarm signaling lights 112 which may be connected to a signaling output of a burglar alarm, panic alarm, fire alarm, medical alert, or any other alarm control panel 800 as a street-side visual notification for first responders such as police, fire, and medical personnel to direct them to the exact postal address of an alarm. Power and control for alarm signaling lights 112, may be supplied via multi-conductor alarm cable 709 connected to signaling outputs of a burglar alarm, panic alarm, fire alarm, medical alert, or any other alarm control panel 800 so that the alarm signaling light(s) 112 may illuminate in response to receiving an alarm signal from a burglar alarm, panic alarm, fire alarm, medical alert, or any other alarm control panel 800. The visual alarm signal generated by alarm signaling light(s) 112 may be initiated by an alarm signal that may be output from various alarm circuits including intrusion alarm switches 804, passive infrared motion detectors (PIR) 805 and panic alarm switches 806 connected to the input of the alarm control panel 800 via multiconductor alarm cable 801, 802, 803.

Figure 9A:
FIG. 9A is a still frame video capture of an example approaching vehicle and its front license plate in day-time conditions, captured by a Novel Versatile Video Surveillance and Alarm Signaling Assembly, according to preferred embodiments of the present invention described herein.

FIG. 9A—FIG. 9A is a still frame video capture of the front of an example vehicle and an example front mounted license plate (inset) using an assembly 100A, 100B, 100C, having surveillance cameras 104A, 104B, and optionally auxiliary illuminators 108A, 108B, coupled to a vertical post 101A, 101B, 101C, preferably at 45 degree angles, or any other angles, perpendicular or parallel in relation to vehicular traffic direction 128 or other areas of interest. The image was captured in daytime conditions. The image provides clear identification of license plate characters enabling various embodiments of the present invention to be used as a capture device for License Plate Capture (LPC), Automatic Number Plate Capture (ANPC), License Plate Recognition (LPR), and Automatic Number Plate Recognition (ANPR) systems.

Figure 9B:
FIG. 9B is a still frame video capture of an example approaching vehicle and its front license plate in night-time conditions, captured by an embodiment of a Novel Versatile Video Surveillance and Alarm Signaling Assembly, according to preferred embodiments of the present invention described herein.

FIG. 9B—FIG. 9B is a still frame video capture of the front of an example vehicle and an example front mounted license plate (inset) using an assembly 100A, 100B, 100C, having surveillance cameras 104A, 104B, and optionally auxiliary illuminators 108A, 108B, coupled to a vertical post 101A, 101B, 101C, preferably at 45 degree angles, or any other angles, perpendicular or parallel in relation to vehicular traffic direction 128 or other areas of interest. The image was captured in daytime conditions. The image provides clear identification of license plate characters enabling various embodiments of the present invention to be used as a capture device for License Plate Capture (LPC), Automatic Number Plate Capture (ANPC), License Plate Recognition (LPR), and Automatic Number Plate Recognition (ANPR) systems.

Figure 10A:
FIG. 10A is a still frame video capture of an example departing vehicle and its front license plate in day-time conditions, captured by an embodiment of a Novel Versatile Video Surveillance and Alarm Signaling Assembly, according to preferred embodiments of the present invention described herein.

FIG. 10A—FIG. 10A is a still frame video capture of the rear of an example vehicle and an example rear mounted license plate (inset) using an assembly 100A, 100B, 100C, having surveillance cameras 104A, 104B, and optionally auxiliary illuminators 108A, 108B, coupled to a vertical post 101A, 101B, 101C, preferably at 45 degree angles, or any other angles, perpendicular or parallel in relation to vehicular traffic direction 128 or other areas of interest. The image was captured in daytime conditions. The image provides clear identification of license plate characters enabling various embodiments of the present invention to be used as a capture device for License Plate Capture (LPC), Automatic Number Plate Capture (ANPC), License Plate Recognition (LPR), and Automatic Number Plate Recognition (ANPR) systems.

Figure 10B:
FIG. 10B is a still frame video capture of an example departing vehicle and its front license plate in night-time conditions, captured by an embodiment of a Novel Versatile Video Surveillance and Alarm Signaling Assembly, according to preferred embodiments of the present invention described herein.

FIG. 10B—FIG. 10B is a still frame video capture of the rear of an example vehicle and an example rear mounted license plate (inset) using an assembly 100A, 100B, 100C, having surveillance cameras 104A, 104B, and optionally auxiliary illuminators 108A, 108B, coupled to a vertical post 101A, 101B, 101C, preferably at 45 degree angles, or any other angles, perpendicular or parallel in relation to vehicular traffic direction 128 or other areas of interest. The image was captured in nighttime conditions. The image provides clear identification of license plate characters enabling various embodiments of the present invention to be used as a capture device for License Plate Capture (LPC), Automatic Number Plate Capture (ANPC), License Plate Recognition (LPR), and Automatic Number Plate Recognition (ANPR) systems.

While some exemplary shapes and sizes have been provided for elements of the assembly 100A, 100B, 100C, it should be understood to one of ordinary skill in the art that the vertical post 101A, 101B, 101C, optional mailbox support arm 102, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the assembly 100A, 100B, 100C, may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the assembly 100A, 100B, 100C, may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the assembly 100A, 100B, 100C, may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the assembly 100A, 100B, 100C, may be coupled by being one of connected to and integrally formed with another element of the assembly 100A, 100B, 100C.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A Versatile Video Surveillance and Alarm Signaling Assembly,
the assembly comprising:
    a vertical post;
    a vertical post cap coupled to a top end of the vertical post;
    a first surveillance camera coupled to the vertical post below the vertical post cap, the first surveillance camera having a first camera lens; and
    a second surveillance camera coupled to the vertical post below the vertical post cap, the second surveillance camera having a second camera lens, wherein the first camera lens and second camera lens are angled between 75 and 200 degrees relative to each other.

2. The assembly of claim 1, further comprising a first auxiliary illuminator coupled to the vertical post, the first auxiliary illuminator having a first light emitting surface, and a second auxiliary illuminator coupled to the vertical post, the second auxiliary illuminator having a second light emitting surface, wherein the first light emitting surface and second light emitting surface are angled between 75 and 200 degrees relative to each other.

3. The assembly of claim 2, wherein the first light emitting surface and second light emitting surface are angled between 85 and 95 degrees relative to each other.

4. The assembly of claim 1, wherein the first camera lens and second camera lens are angled between 85 and 200 degrees relative to each other.

5. The assembly of claim 1, further comprising a mailbox support arm that is coupled to the vertical post, the mailbox support arm configured to support a mailbox.

6. The assembly of claim 1, wherein the vertical post is linear in shape, and wherein a mailbox support arm that is linear in shape is coupled to the vertical post so that the mailbox support arm and vertical post are substantially perpendicular to each other.

7. The assembly of claim 6, further comprising a mailbox that is coupled to the horizontal post.

8. The assembly of claim 7, wherein the mailbox comprises a mail axis, and wherein the first camera lens of the first surveillance camera is angled between 30 and 100 degrees relative to the mail axis.

9. The assembly of claim 1, wherein a surveillance camera selected from the first surveillance camera and the second surveillance camera is movably coupled to the vertical post.

10. The assembly of claim 1, further comprising a network interface that is in communication with the first and second surveillance cameras.

11. The assembly of claim 1, further comprising an alarm signaling light that is configured to illuminate in response to receiving an alarm signal.

12. A Versatile Video Surveillance and Alarm Signaling Assembly, the assembly comprising:
    a vertical post;
    a mailbox;
    a mailbox support arm that is coupled to the vertical post, wherein the mailbox is coupled to the mailbox support arm;
    a first surveillance camera coupled to the vertical post, the first surveillance camera having a first camera lens;
    a second surveillance camera coupled to the vertical post, the second surveillance camera having a second camera lens, wherein the first camera lens and second camera lens are angled between 75 and 200 degrees relative to each other; and a network interface that is in communication with the first and second surveillance cameras.

13. The assembly of claim 12, further comprising a first auxiliary illuminator coupled to the vertical post, the first auxiliary illuminator having a first light emitting surface, and a second auxiliary illuminator coupled to the vertical post, the second auxiliary illuminator having a second light emitting surface, wherein the first light emitting surface and second light emitting surface are angled between 75 and 200 degrees relative to each other.

14. The assembly of claim 13, wherein the first light emitting surface and second light emitting surface are angled between 85 and 95 degrees relative to each other.

15. The assembly of claim 12, wherein the first camera lens and second camera lens are angled between 85 and 200 degrees relative to each other.

16. The assembly of claim 12, wherein the vertical post is linear in shape, wherein the mailbox support arm is linear in shape, and wherein the mailbox support arm is coupled to the vertical post so that the mailbox support arm and vertical post are substantially perpendicular to each other.

17. The assembly of claim 12, wherein a surveillance camera selected from the first surveillance camera and the second surveillance camera is movably coupled to the vertical post.

18. The assembly of claim 12, wherein the mailbox comprises a mail axis, and wherein the first camera lens of the first surveillance camera is angled between 30 and 100 degrees relative to the mail axis.

19. The assembly of claim 12, further comprising an alarm signaling light that is configured to illuminate in response to receiving an alarm signal.

20. A Versatile Video Surveillance and Alarm Signaling Assembly, the assembly comprising:
a vertical post;
a first surveillance camera coupled to the vertical post, the first surveillance camera having a first camera lens; and
a second surveillance camera coupled to the vertical post, the second surveillance camera having a second camera lens, wherein the first camera lens and second camera lens are angled between 75 and 200 degrees relative to each other; and
a first auxiliary illuminator coupled to the vertical post, the first auxiliary illuminator having a first light emitting surface, and a second auxiliary illuminator coupled to the vertical post, the second auxiliary illuminator having a second light emitting surface, wherein the first light emitting surface and second light emitting surface are angled between 75 and 200 degrees relative to each other.

* * * * *